US006934911B2

(12) United States Patent
Salmimaa et al.

(10) Patent No.: US 6,934,911 B2
(45) Date of Patent: Aug. 23, 2005

(54) GROUPING AND DISPLAYING OF CONTEXTUAL OBJECTS

(75) Inventors: Marja Salmimaa, Tampere (FI); Juha Lehikoinen, Lakiala (FI); Hannu Korhonen, Tampere (FI)

(73) Assignee: Nokia Corporation, Espoo (FI)

(*) Notice: Subject to any disclaimer, the term of this patent is extended or adjusted under 35 U.S.C. 154(b) by 604 days.

(21) Appl. No.: 10/056,674

(22) Filed: Jan. 25, 2002

(65) Prior Publication Data

US 2003/0142125 A1 Jul. 31, 2003

(51) Int. Cl.⁷ .......................... G06F 3/14; H04M 11/08
(52) U.S. Cl. .................. 715/744; 715/864; 715/835; 715/747; 455/412.2; 455/412.1; 455/414.1
(58) Field of Search ................ 715/645, 152, 715/744, 745, 747, 864, 853, 866, 765, 835, 810, 811, 812, 733, 751, 752, 779, 814, 825, 840, 841; 455/414, 3.06, 412.1, 412.2, 414.1, 414.2, 414.3, 556.1, 556.2, 557, 566, 344; 340/998

(56) References Cited

U.S. PATENT DOCUMENTS

| | | | | |
|---|---|---|---|---|
| 5,796,394 A | * | 8/1998 | Wicks et al. | 715/751 |
| 5,920,826 A | * | 7/1999 | Metso et al. | 455/557 |
| 5,943,399 A | | 8/1999 | Bannister et al. | |
| 5,950,130 A | | 9/1999 | Coursey | |
| 6,020,881 A | | 2/2000 | Naughton et al. | |
| 6,047,197 A | | 4/2000 | Jarrad | |
| 6,119,014 A | * | 9/2000 | Alperovich et al. | 455/412.1 X |
| 6,362,841 B1 | | 3/2002 | Nykanen | |
| 6,384,850 B1 | | 5/2002 | McNally et al. | |
| 6,466,236 B1 | | 10/2002 | Pivowar et al. | |
| 6,522,875 B1 | * | 2/2003 | Dowling et al. | 455/414.3 |
| 6,668,177 B2 | | 12/2003 | Salmimaa et al. | |
| 6,680,675 B1 | * | 1/2004 | Suzuki | 340/988 |
| 6,727,930 B2 | * | 4/2004 | Currans et al. | 345/864 |
| 2001/0030664 A1 | * | 10/2001 | Shulman et al. | 345/835 |
| 2002/0061771 A1 | * | 5/2002 | Hwang et al. | 455/566 |
| 2002/0160805 A1 | * | 10/2002 | Laitinen et al. | 455/566 X |

FOREIGN PATENT DOCUMENTS

| | | |
|---|---|---|
| WO | WO99/21164 | 4/1999 |
| WO | WO99/49453 | 9/1999 |
| WO | WO 00/65429 | 11/2000 |

* cited by examiner

Primary Examiner—Raymond J. Bayerl
(74) Attorney, Agent, or Firm—Banner & Witcoff, Ltd.

(57) ABSTRACT

An apparatus and method for displaying a plurality of icons on the display of a mobile terminal are provided. Messages are first sorted by comparing characteristics of the messages with first context category values. The messages may be assigned to discrete groups. The messages within each of the groups are then sorted by comparing characteristics of the messages with second context category values. Icons are assigned to the messages and displayed on a display of the mobile terminal.

25 Claims, 7 Drawing Sheets

GROUPING AND DISPLAYING OF CONTEXTUAL OBJECTS

FIELD OF THE INVENTION

The invention relates to the display of objects on display screens of portable electronic devices. More particularly, the invention provides methods and devices for sorting, grouping and displaying icons.

BACKGROUND OF THE INVENTION

Graphical user interface screens that include icons have been widely used with modern computer systems to represent application programs and documents on computer displays. The well-known MAC OS operating system from Apple Computer Corporation and the WINDOWS operating system from Microsoft Corporation are two examples of widely used operating systems that utilize graphical user interfaces.

More recently, mobile terminals such as cellular telephones and wireless-enabled PDAs have incorporated graphics-oriented technology that allows a user to select application programs, web sites, and documents. Following increases in computing performance and memory capacity, mobile terminals now host an increasing number of application programs and capabilities. The Nokia 9210 COMMUNICATOR, for example, supports numerous functions such as telephone, fax, e-mail, calendar, and contacts features.

In order to maintain a convenient handheld form factor, the graphics displays for mobile terminals are necessarily small, thus limiting the amount of information that can be comfortably viewed at one time. Consequently, one problem confronting designers of such devices is determining how to maximize the number of icons and other graphical symbols on the display of such devices without making the symbols too small to see.

U.S. Pat. No. 6,047,197, entitled "Icon Driven Phone Menu System," describes a cellular telephone including a display mode selector that allows a user to select one of two display modes. In a first display mode, icons representing applications are arranged in rows and columns, thus allowing a user to navigate in two dimensions using cursor buttons. In a second display mode, the icons are displayed on one side of the cellular telephone display with a text field adjacent to each icon that identifies the icon.

Although the display modes in the aforementioned patent allow a user to navigate through numerous icons on the display, each icon takes up roughly the same amount of space on the display, regardless of its importance to the particular user. For example, if one user predominantly uses application programs A and B, whereas a second user predominantly uses application programs C and D, each user must navigate through the same set of icons in order to locate his or her desired application programs.

As location-based information and location-based services become a reality, mobile terminal users will receive even more messages and associated icons. The messages may include location-specific messages (e.g., advertisements for restaurants and movie theaters). With prior art devices, it will become increasingly burdensome for users to obtain information about the messages. Users will have to spend more time sorting through icons to find icons corresponding to the application programs and messages they desire to execute or view.

Therefore, there exists a need in the art for systems and methods that allow users to display icons on a small screen in a manner that allows users to quickly obtain desired information.

SUMMARY OF THE INVENTION

One or more of the above-mentioned needs in the art are satisfied by the disclosed systems and methods that sort and represent icons in a manner that allows users to determine relevant information from the placement and/or sizes of the icons. Embodiments wherein certain icons are represented in predetermined locations or with predetermined sizes allow the user to quickly identify icons that are likely to be of interest to the user.

A first embodiment of the invention provides a method of grouping and displaying a plurality of icons that can be selected by a user from a display on a mobile terminal. The method includes receiving a plurality of messages from message sources and sorting the plurality of messages into a set of groups in accordance with one or more characteristics associated with each of the plurality of messages and a first context category. Next, the messages are sorted within each of the groups in accordance with one or more characteristics associated with each of the plurality of messages and a second context category. An icon is associated with each of the plurality of messages. And, the icons are represented on the display in accordance with the performed sorting.

In another embodiment, a mobile terminal is provided. The mobile terminal includes a display capable of displaying graphical icons and a user input device that permits a user of the mobile terminal to select one or more of the graphical icons displayed on the display. A processor programmed with computer-executable instructions is also included. The computer-executable instructions cause the mobile terminal to perform the steps including: (a) receiving a plurality of messages from message sources; (b) sorting the plurality of messages into a set of groups in accordance with one or more characteristics associated with each of the plurality of messages and a first context category; (c) sorting the messages within each of the groups in accordance with one or more characteristics associated with each of the plurality of messages and a second context category; (d) associating an icon with each of the plurality of messages; and (e) representing the icons on the display in accordance with the sorting performed in (b) and (c).

In other embodiments of the invention, computer-executable instructions for implementing the disclosed methods are stored as control logic or computer-readable instructions on computer-readable media, such as an optical or magnetic disk.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
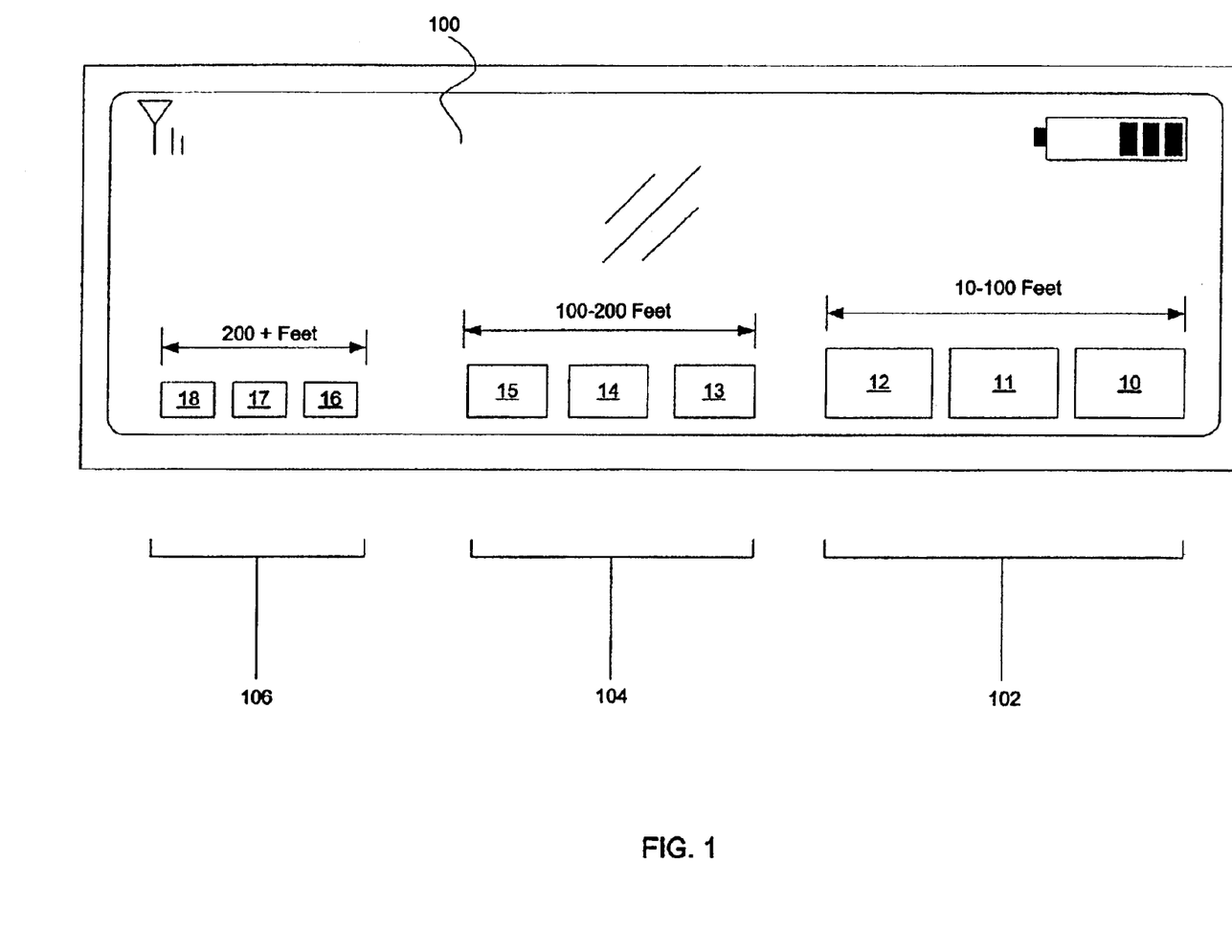
FIG. 1 shows a display having a group of icons arranged in accordance with an embodiment of the invention.

FIG. 1 shows a mobile terminal display 100 having icons 10–18 arranged in accordance with an embodiment of the invention. The mobile terminal may comprise a Nokia 9210 COMMUNICATOR, a cellular telephone, portable computer, or any other mobile electronic device having a display. In the embodiment shown in FIG. 1, icons 10–12, 13–15 and 16–18 are arranged in three separate groups 102, 104, and 106 respectively. Each of the icons may be assigned to a group based on a comparison of one or more characteristics associated with a corresponding message and a context category. In the embodiment shown in FIG. 1, the context category is physical distance. For example, icons 10–12 correspond to message sources within 10–100 feet of the mobile terminal. The dimensions of the icons within groups 102, 104 and 106 may be a function of the comparison of the one or more characteristics associated with the corresponding messages and the context category. As is shown in the FIG. 1, icons 13–15 correspond to message sources that are at a distance of 100–200 feet from the mobile terminal and the icons are smaller than icons 10–12, which correspond to message sources that are closer to the mobile terminal.

Display 100 includes icons having different dimensions, wherein the dimensions generally correspond to the degree to which messages associated with each icon match a context category. Other visually discernible differences in icon display characteristics can be used to signify differences in comparison values, such as different widths; different heights; colors; brightness, intensities; shapes; position or the like.

The order of icons within each of the groups may correspond to another context category. For example, a context category may be created to place icons corresponding to stores ahead of icons corresponding to theaters. In this case, icon 10 may represent a store and icon 11 may represent a theater. As a mobile terminal moves around a geographic area, the terminal may receive messages from retail stores, restaurants, movie theaters, public transportation terminals, Web sites, and other entities. The messages can be provided to the mobile terminal based on the terminal's location within a predetermined geographic area (for example, the area served by a particular cell phone tower), or based on other factors (e.g., the identity of the mobile user, time of day, other demographic factors, or the precise geographic location of the mobile terminal.). A user may select context categories to help organize the icons in a manner described in detail below.

When distance, whether physical or temporal, is selected as one of the context categories, the proximities of the sources of the received messages may be derived by the mobile terminal based on a comparison of the terminal's specific location with the location of the source of the message, or it could be provided directly by the entity if the entity is able to discern the location of the mobile terminal. The location of the mobile terminal may be determined by a variety of conventional methods and devices such as identifying a cell phone tower or using a global positioning system.

Figure 2:
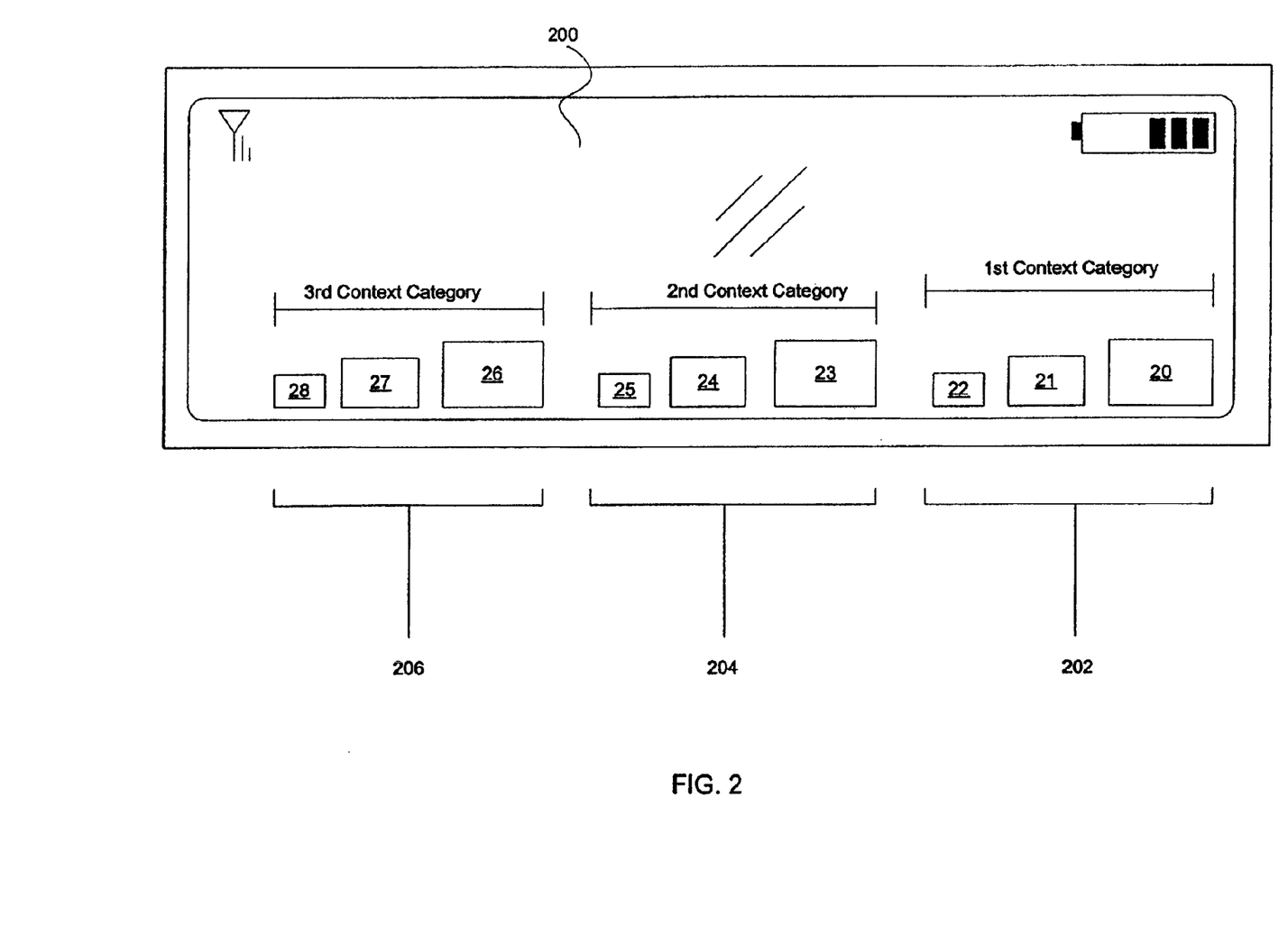
FIG. 2 shows a display having a group of icons arranged in accordance with another embodiment of the invention.

FIG. 2 shows a mobile terminal display 200 having icons 20–28 arranged in accordance with another embodiment of the invention. Icons 20–22, 23–25 and 26–28 are arranged in groups 202, 204 and 206, respectively. Each of the icons may be assigned to a group based on a comparison of one or more characteristics associated with a corresponding message and a context category. In an illustrative embodiment, a context category may be defined to place restaurants first, stores second and bars third. Group 202 may correspond to restaurants, group 204 may correspond to stores and group 206 may correspond to bars. Within each of the groups, the icons may be automatically positioned and/or sized as a result of a comparison with another context category. For example, when the second context category is distance between a message source and the mobile terminal, the relative size of the icon 20, when compared to icon 21, may indicate to a user that icon 20 corresponds to the restaurant that is closer to the mobile terminal than the restaurant corresponding to icon 21.

In one aspect of the invention, a context category may correspond to an ordered list of tasks that a user desires to perform. For example, a user may desire to first go to a restaurant, next go to a store and finally go to a bar. Group 202 may correspond to restaurants, group 204 may correspond to stores and group 206 may correspond to bars. In another aspect of the invention, each of the groups may be deleted after a user performs the indicated task or after a predetermined length of time. For example, after selecting one of the restaurants in group 202, icons 20–22 may be deleted. After icons 20–22 have been deleted, the remaining icons may be enlarged to facilitate viewing by the user. Alternatively, the remaining icons may be shifted and new icons corresponding to another task may be added to display 200. The contents of each group may either be updated automatically, such as at predetermined times, or manually after a request from the user.

Individual icons may also be deleted after predetermined time periods or at predetermined times. One or more of the messages may be time stamped with time periods or times. A time period may determine how long an icon will be displayed, such as 30 minutes. For example, an advertisement message may be time stamped to be deleted 30 minutes after the message is received at a mobile terminal. A time period may also correspond to the availability time of a service, such as 1:00 to 2:00. A predetermined time may correspond to a time that a service will no longer be offered, such as 2:00. In one embodiment of the invention, users may set deletion times and deletion time periods for context categories or icons.

Figure 3:
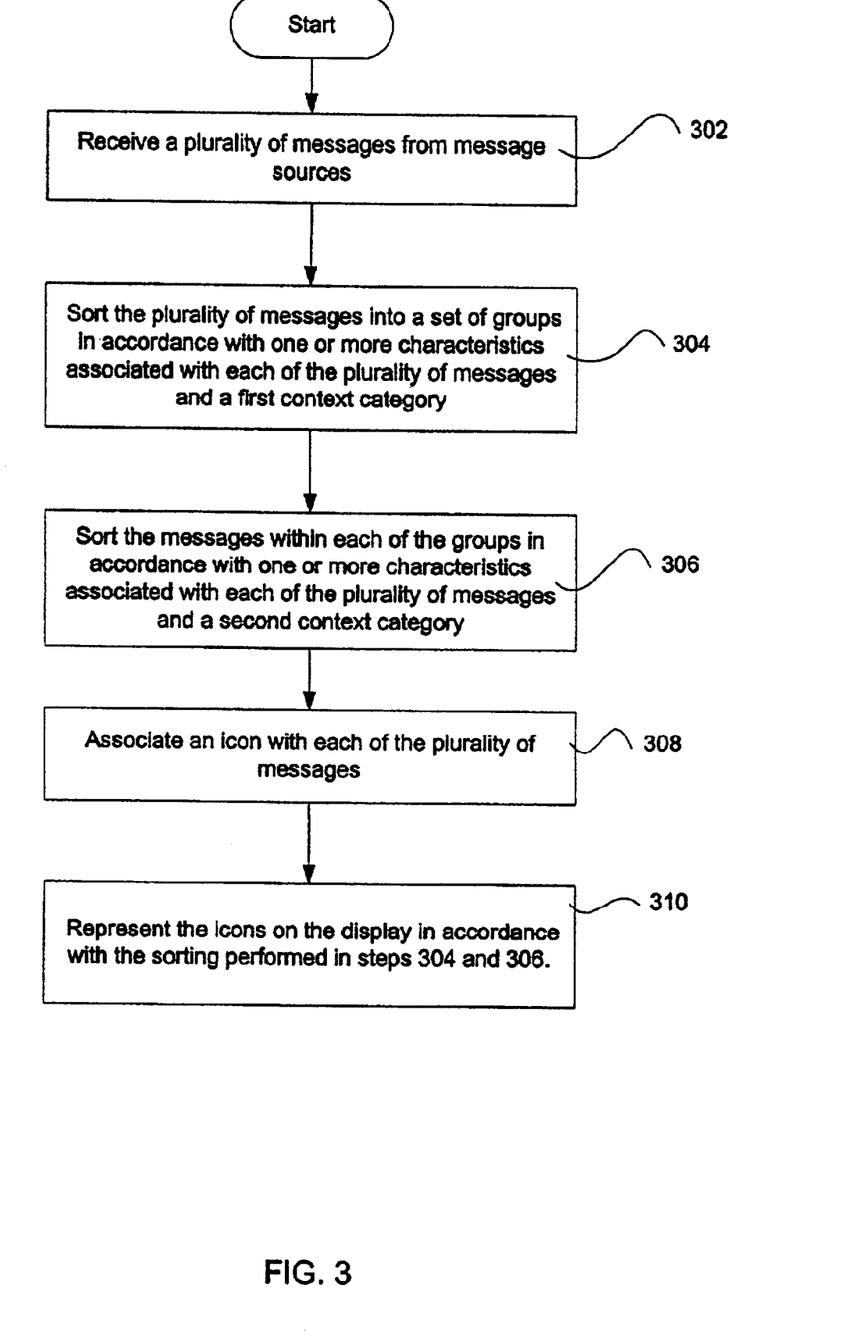
FIG. 3 shows a method of representing and displaying icons in accordance with an embodiment of the invention.

FIG. 3 illustrates a method that may be used to arrange icons on displays 100 and 200. First, in step 302, the mobile terminal receives a plurality of messages from message sources. In an illustrative example, the user is in a geographic area that includes several sources of food, stores, bars and public transportation sources. The messages may be received from a wireless LAN, a cell phone network, or by other means. In step 304, the plurality of messages are sorted into a set of groups in accordance with one or more characteristics associated with each of the plurality of messages and a first context category. For example, a user may define a context category to rank sources of food first, stores second and bars third. Context categories and characteristics may be specified by the user and may include an endless number of factors that a user may find relevant, such as the type of message source, physical or temporal distance, a grade of service, price and availability.

Next, in step 306, the messages may be sorted within each of the groups in accordance with one or more characteristics associated with each of the plurality of messages and a second context category.

Icons may be associated with each of the plurality of messages in step 308. Icons may be transmitted as part of the message or may be stored locally in a memory of the mobile terminal. In one embodiment, messages are transmitted in a markup language such as the extensible markup language (XML) to conveniently separate characteristics and icons. Step 308 may include extracting an icon from one of the plurality of messages.

Finally, in step 310, the icons may be represented on the display in accordance with the sorting performed in steps 308 and 310. Step 310 may include representing, in each group, an icon that corresponds to a message having one or more characteristics that best match the second context category in a format that is enlarged in relation to other icons in the group, as shown in FIG. 2. Alternatively, the icons within each group may have uniform dimensions and the dimensions may be a function of the assigned group, as shown in FIG. 1.

In one embodiment of the invention, the icons shown in FIGS. 1 and 2 are symbols that represent the message sources, such as corporate logos or trademarks. Of course, one or more of the icons may comprise a graphic symbol corresponding to an application program, a hyperlink to a Web page, an informational message, a document, a prepopulated e-mail inquiry, or any of various other types of objects. The user of the mobile terminal can select any object using a conventional keypad, cursor button, stylus, or the like. It will be appreciated that other types of icons and icon selection mechanisms can be used without departing from the principles of the invention.

Figure 4:
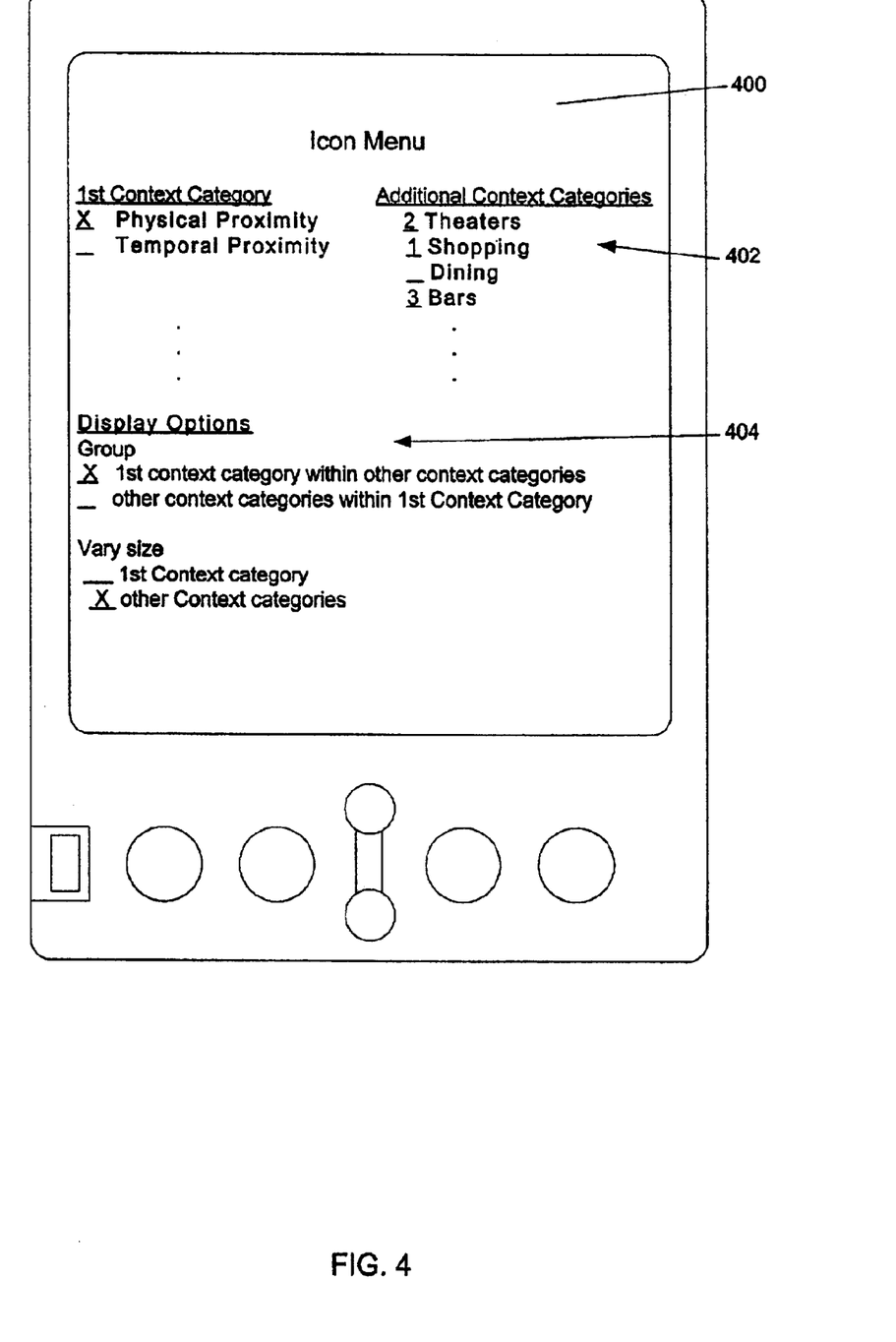
FIG. 4 shows a graphical user interface that allows a user to customize the display of icons in accordance with an embodiment of the invention.

FIG. 4 illustrates an exemplary graphical user interface 400 that can be used to configure the selection, size and placement of icons displayed on the mobile terminal. A user may assign context categories values in section 402. Interface 400 shows that the user has selected physical proximity as the first context category and shopping, theaters and bars as the second, third and fourth context categories. Of course, the present invention is not limited to the context categories or number of context categories shown. As mentioned above, there are an endless number of context categories that may be utilized and, in some embodiments, a user may create new context categories. The mobile terminal may also be configured to sub-divide context categories. For example, if a user selects physical distance as a first context category and "stores" as a second context category, a mobile terminal may be programmed with computer-executable instructions that analyze incoming messages and determine a sorting criteria. The mobile terminal may determine that the messages within the context category of stores are divided into food stores, sporting goods stores and department stores. Three corresponding context categories may be created. Alternatively, the mobile terminal may be programmed with a set of sub-divided context categories for a variety of context categories.

Display options may be selected in section 404. In particular, a user may select to group a plurality of context categories within a single context category, as shown in FIG. 1, or group a given context category within the other context categories, as shown in FIG. 2. The user may also optionally choose which context category or categories to use to determine sizes of the icons. Of course, graphical user interface 400 may include additional menu elements, such as menu elements for setting deletion times and deletion time periods for context categories and/or icons.

In one aspect of an invention, a group of mobile terminals may be used to convey voting information to users. For example, a group of people may desire to dine together in a certain area of a city. One context category may correspond to restaurants in the area. A second context category may correspond to the results of each of the people voting on which restaurant to visit. The first category shown in FIG. 2 may correspond to all of the restaurants in the area and icon 20 may correspond to restaurant having the highest vote total. A vote may be made based on preference information stored in one or more of the mobile terminals. Of course, aspects of the present invention may be used to allow two or more users to exchange information by means other than voting. For example, two users could decide to share information and a context category could summarize the shared information.

Figure 5:
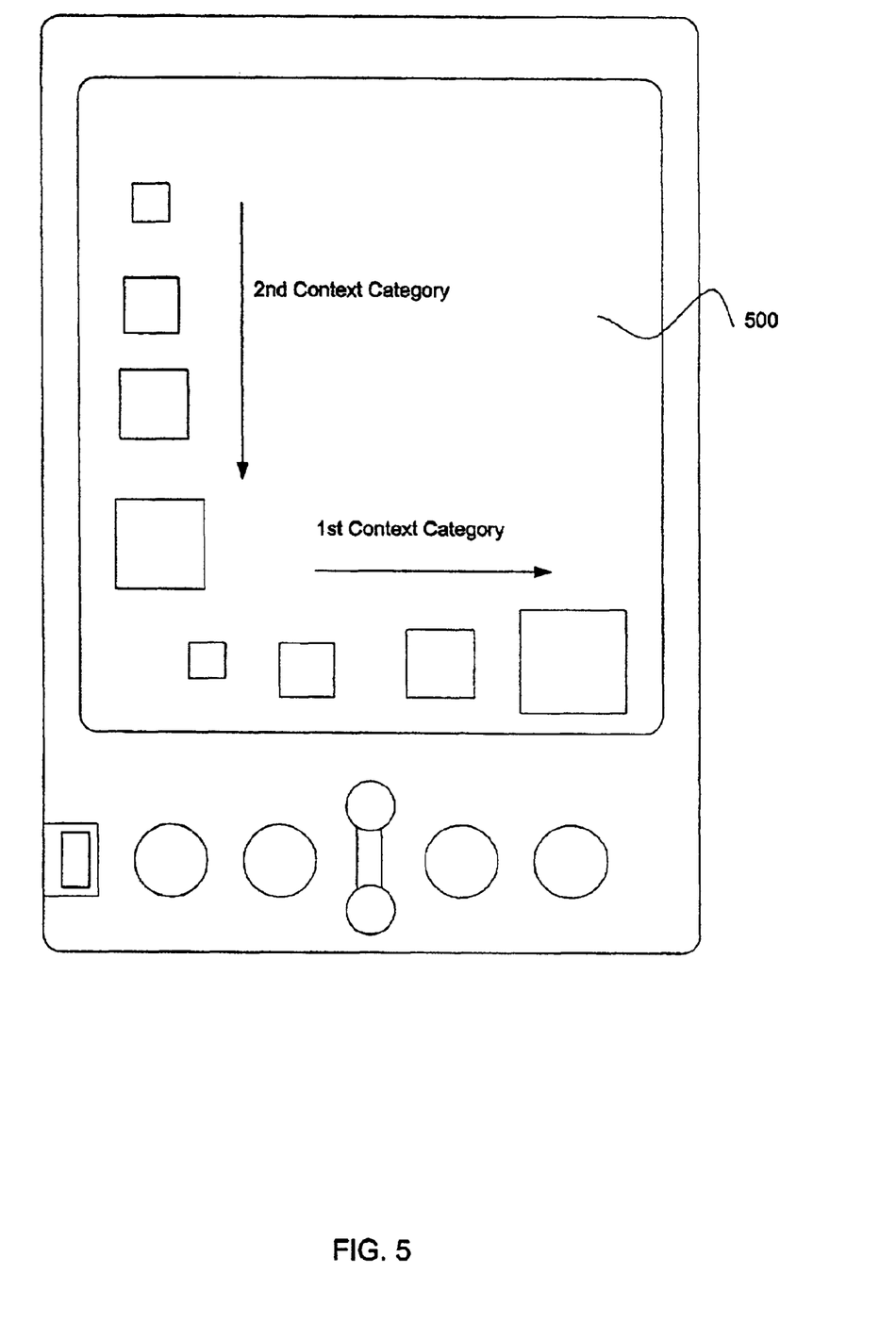
FIG. 5 shows a display screen having icons arranged in a row and a column in accordance with an embodiment of the invention.
Figure 6:
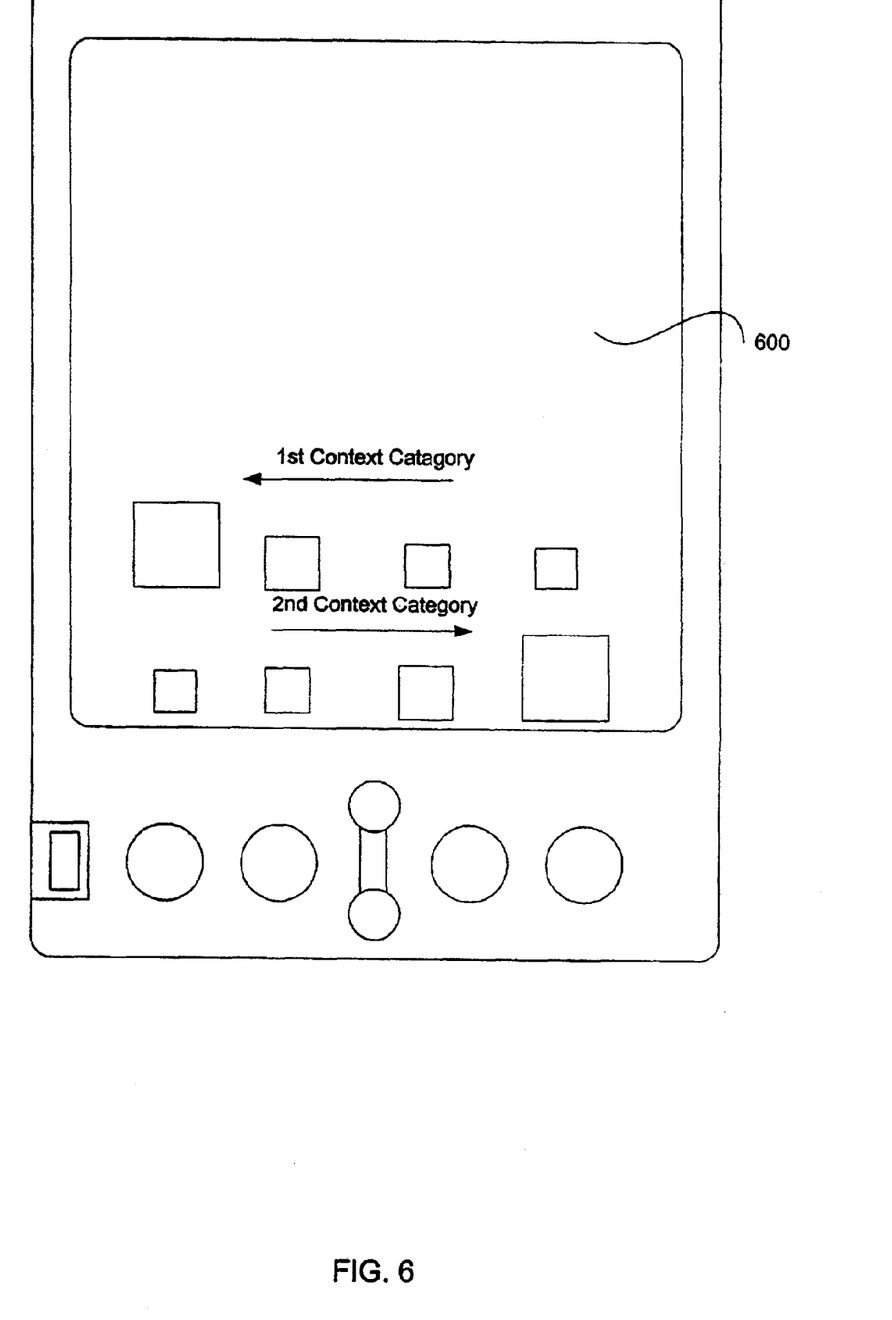
FIG. 6 shows a display screen having icons arranged in rows in accordance with an embodiment of the invention.

The locations of context category sections are not limited to the locations shown in FIGS. 1 and 2. FIG. 5 shows an embodiment in which a display 500 includes a first context category section formed along a horizontal axis and a second context category section formed along a vertical axis. Of course, there are numerous different ways to display icons to provide information to the user. FIG. 6 shows a display 600 in which first and second context category sections are formed horizontally in different rows. In an alternative embodiment, the first and second context category sections may be formed vertically in different columns. The icons can also be arranged in navigation bars or other types of arrangements that convey context category information to a user.

Figure 7:
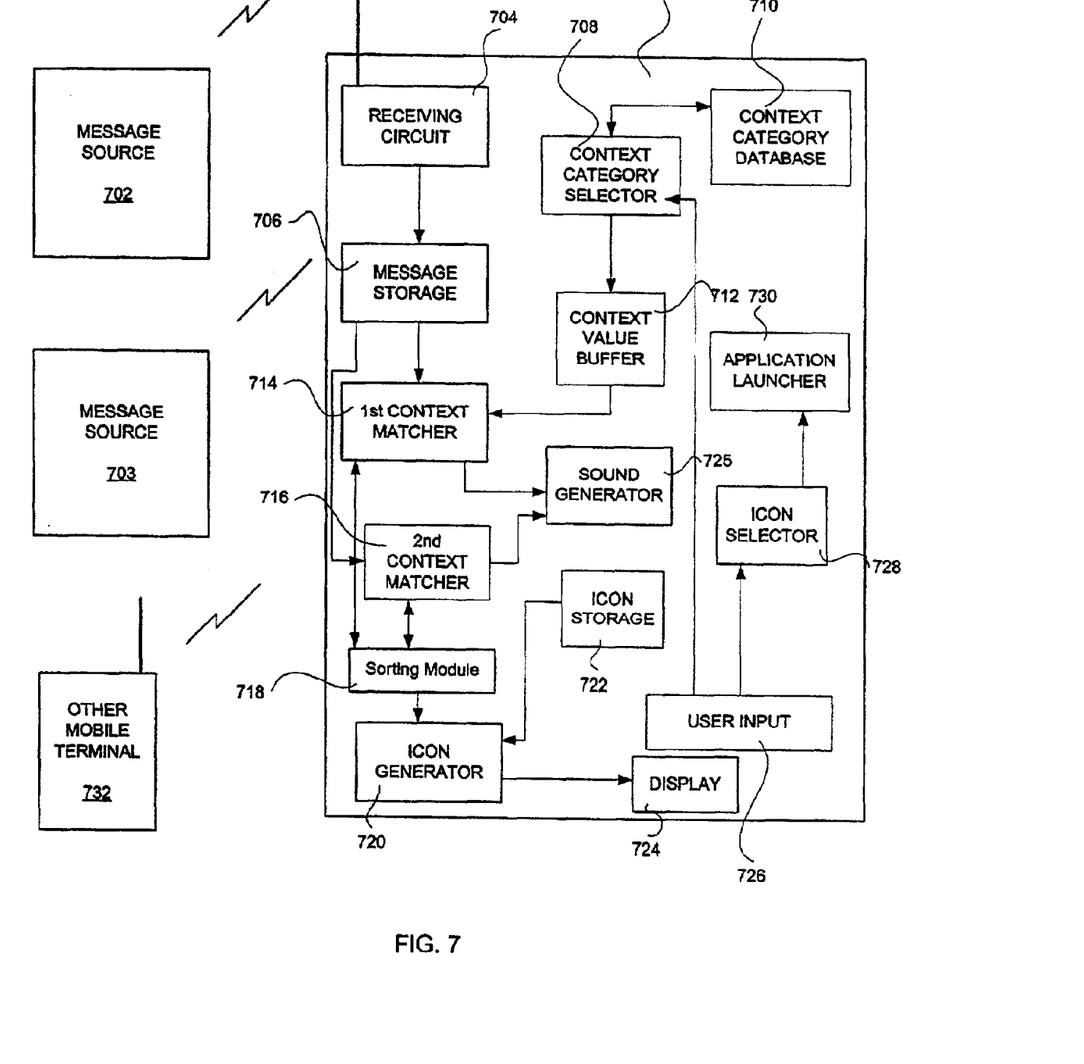
FIG. 7 shows a mobile terminal configured in accordance with various principles of the invention.

FIG. 7 shows a mobile terminal 700 configured in accordance with various principles of the invention. Although not explicitly shown in FIG. 7, the mobile terminal may include a microprocessor or other computing device and memory for storing computer-executable instructions to carry out the principles of the invention. As shown in FIG. 7, mobile terminal 700 communicates with a message source 702 and a message source 703 through a receiving circuit 704. In one embodiment, message sources 702 and 703 communicate with mobile terminal 700 in a wireless manner (e.g., radio frequency, optical, or other communication means). Message sources 702 and 703 may include such entities as: restaurants, travel agencies, hotels, Web sites or any other entities able to communicate with mobile terminal 700. Two message sources are shown for illustrative purposes only with the understanding that several additional message sources may transmit messages to mobile terminal 700.

Messages that are transmitted by message sources 702 and 703 may include characteristics such as the geographic location of an establishment; proximity of the establishment to a particular mobile user or other geographic location; price information; corporate logos; hyperlinks to Web pages; advertisements (including audio, video, or text); entertainment services (e.g., music, videos, and the like); indicators identifying grades of service (e.g., AAA ratings, hotel "star" ratings, restaurant rankings, and the like); availability of services (e.g., indicating whether a hotel has vacancies; that a particular restaurant is crowded; or the average waiting time for service at a particular restaurant); personal e-mails from friends or family, or any other type of characteristics that can be matched to context values. Moreover, messages may also include icons.

Messages are received by receiving circuit 704 and stored in a message storage area 706. Messages may be time-stamped and expire or be deleted after a certain period of time. A context category selector 708 may be used to retrieve context category values from a context category database 710. As stated above, in some embodiments, a user may define new context categories. The context categories may be stored in context category database 710. The retrieved context category values may then be transmitted to a context category value buffer 712. Messages are sorted with a first context category matcher 714 and a second context category matcher 716. Sorting may be performed by comparing one or characteristics of the messages with the context category values. For example, when a context category of "price" is selected, a first message having a price characteristic of $1 and a second message having a price characteristic of $2 would be sorted so that the first message is ahead of the second message. Of course, additional context category matchers may also be included. Context category matchers may also be used successively.

A sorting module 718 may be included to control the order of sorting. For example, sorting module 718 may receive the identification of groups of messages from first context matcher 714 and transmit each of the groups to second context matcher 716 for further sorting within the groups. In embodiments that utilize a single context category matcher, sorting module 718 may control the order of sorting and loading of context category values into the context category matcher. Sorting module 718 may also drive an icon generator 720. In some cases, icon generator 720 will retrieve an icon from icon storage area 722 and may produce a scaled version of the icon.

The icons may be transmitted to a display 724. One or more of the context category matchers may also be configured to identify messages that have predetermined characteristics. For example, a context category matcher may be programmed to particularly identify any message received from a certain hardware store. An icon associated with the message may be placed in a predetermined location of display 724 to identify the significance of the message. The context category matcher may also or alternatively transmit a signal to a sound generator 725 to alert the user of a message having one or more predetermined characteristics. For example, the user may be shopping for shoes and wish to receive an audible tone when the mobile terminal receives a message advertising a shoe sale.

A user input device 726 can be used to modify the selection of context category values stored context category database 710. User input device 726 may be implemented with a keypad, cursor, stylus, or similar input device. An optional icon selector function 728, for example a magnifying glass selector, allows the user to move over icons on the display to depict further information regarding the icons and to temporarily enlarge icons of potential interest. Other icon selectors can of course be used without departing from the inventive principles. An application launcher 730 launches an application associated with the selected icon in response to further user input. For example, application launcher 730 may start a Web browsing application if the particular icon has an associated hyperlink. Alternatively, if an icon represents a document, application launcher 730 can launch a document viewer or editor program.

Of course, other mobile terminals 732 may also transmit messages to mobile terminal 700. For example, a group of mobile terminals may communicate when conducting the voting operation described above.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method of grouping and displaying a plurality of icons that can be selected by a user from a display on a first mobile terminal, the method comprising:

(a) receiving a plurality of messages from message sources;

(b) sorting the plurality of messages into a set of groups in accordance with one or more characteristics associated with each of the plurality of messages and a first context category;

(c) sorting the messages within each of the groups in accordance with one or more characteristics associated with each of the plurality of messages and a second context category;

(d) associating an icon with each of the plurality of messages; and (e) representing the icons on the display in accordance with the sorting performed in (b) and (c).

2. The method of claim 1, wherein the first context category comprises distances between the message sources and the first mobile terminal.

3. The method of claim 1, wherein the second context category comprises distances between the message sources and the first mobile terminal.

4. The method of claim 1, wherein (e) comprises:

representing the groups in distinct sections of the display; and wherein sizes of each of the icons within each group correspond to the sorting performed in (c).

5. The method of claim 4, wherein (e) further comprises:

representing in each group an icon that corresponds to a message having one or more characteristics that best match the second context category in a format that is enlarged in relation to other icons in the group.

6. The method of claim 1, wherein (e) comprises:

representing the groups in distinct sections of the display; and wherein sizes of the icons within each group are uniform.

7. The method of claim 6, wherein (e) further comprises:

representing icons in a first group that corresponds to messages having one or more characteristics that best match the first context category in a format that is enlarged in relation to icons in the other groups within the set of groups.

8. The method of claim 1, wherein the first context category comprises an ordered list of tasks and each of the groups within the set of groups corresponds to one of the tasks.

9. The method of claim 8, further including:

(f) deleting the representation of a group when a corresponding task is completed.

10. The method of claim 1, wherein (d) comprises extracting an icon from one of the plurality of messages.

11. The method of claim 1, wherein in (b) and (c) at least some of the characteristics are extracted from the plurality of messages.

12. The method of claim 1, wherein in step (b) at least one of the context categories is set by the user of the first mobile terminal.

13. The method of claim 1, wherein the icons are displayed in navigation bar formed along at least a portion of a bottom of the display.

14. The method of claim 1, wherein the set of groups comprises two groups.

15. The method of claim 1, further including:
(f) deleting at least one of the icons after a predetermined time period.

16. The method of claim 15, wherein the icon deleted instep (f) corresponds to a message that has been time stamped with the predetermined time period.

17. The method of claim 15, wherein the predetermined time period is selected by the user.

18. The method of claim 1, wherein one of the message sources comprises a second mobile terminal.

19. The method of claim 1, wherein one of the first and second context categories comprises information exchanged between the first mobile terminal and at least one additional mobile terminal.

20. The method of claim 1, wherein one of the first and second context categories comprises voting results of votes received from the first mobile terminal and at least one additional mobile terminal.

21. A mobile terminal comprising:
a display capable of displaying graphical icons;
a user input device that permits a user of the mobile terminal to select one or more of the graphical icons displayed on the display; and
a processor programmed with computer-executable instructions that, when executed cause the mobile terminal to perform the steps comprising:
(a) receiving a plurality of messages from message sources;
(b) sorting the plurality of messages into a set of groups in accordance with one or more characteristics associated with each of the plurality of messages and a first context category;
(c) sorting the messages within each of the groups in accordance with one or more characteristics associated with each of the plurality of messages and a second context category;
(d) associating an icon with each of the plurality of messages; and
(e) representing the icons on the display in accordance with the sorting performed in (b) and (a).

22. The mobile terminal of claim 21, further comprising a context category database storing context category values.

23. A mobile terminal comprising:
a receiving circuit that receives a plurality of messages containing information relating to a particular service that is potentially available to a user of the mobile terminal;
a message storage area that stores the plurality of messages;
a display unit capable of displaying graphical icons;
a context matching function that:
(a) sorts the plurality of messages into a set of groups in accordance with one or more characteristics associated with each of the plurality of messages and a first context category;
(b) sorts the messages within each of the groups in accordance with one or more characteristics associated with each of the plurality of messages and a second context category; and
a display function that displays icons associated with the messages in a format determined by the sorting performed in (a) and (b).

24. The mobile terminal of claim 23, further comprising a context category database storing context category values.

25. A computer-readable medium containing computer-executable instructions for causing a mobile terminal having a display to perform the steps of:
(a) receiving a plurality of messages from message sources;
(b) sorting the plurality of messages into a set of groups in accordance with one or more characteristics associated with each of the plurality of messages and a first context category;
(c) sorting the messages within each of the groups in accordance with one or more characteristics associated with each of the plurality of messages and a second context category;
(d) associating an icon with each of the plurality of messages; and
(e) representing the icons on the display in accordance with the sorting performed in (b) and (c).

* * * * *

UNITED STATES PATENT AND TRADEMARK OFFICE
CERTIFICATE OF CORRECTION

PATENT NO. : 6,934,911 B2
DATED : August 23, 2005
INVENTOR(S) : Marja Salmimaa et al.

It is certified that error appears in the above-identified patent and that said Letters Patent is hereby corrected as shown below:

Column 9,
Line 43, replace "(a)." with -- (c). --.

Signed and Sealed this

Eighteenth Day of April, 2006

JON W. DUDAS
*Director of the United States Patent and Trademark Office*